United States Patent
Yajima et al.

(10) Patent No.: US 9,851,566 B2
(45) Date of Patent: Dec. 26, 2017

(54) ELECTRONIC APPARATUS, DISPLAY DEVICE, AND CONTROL METHOD FOR ELECTRONIC APPARATUS

(71) Applicant: SEIKO EPSON CORPORATION, Tokyo (JP)

(72) Inventors: Kenro Yajima, Matsumoto (JP); Yutaka Fujimaki, Matsumoto (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 161 days.

(21) Appl. No.: 14/955,467

(22) Filed: Dec. 1, 2015

(65) Prior Publication Data
US 2016/0187661 A1 Jun. 30, 2016

(30) Foreign Application Priority Data
Dec. 24, 2014 (JP) ................. 2014-260215

(51) Int. Cl.
*G02B 27/01* (2006.01)
(52) U.S. Cl.
CPC .... *G02B 27/0172* (2013.01); *G02B 2027/014* (2013.01); *G02B 2027/0138* (2013.01); *G02B 2027/0187* (2013.01)
(58) Field of Classification Search
CPC ...... G02B 2027/0138; G02B 2027/014; G02B 2027/0187; G02B 27/0172; G02B 27/017
See application file for complete search history.

(56) References Cited

U.S. PATENT DOCUMENTS

| 9,007,301 B1* | 4/2015 | Raffle | G09G 3/003 345/156 |
| 2006/0103624 A1 | 5/2006 | Ishito et al. | |
| 2010/0117837 A1* | 5/2010 | Stirling | A61B 5/1127 340/573.1 |
| 2012/0147531 A1* | 6/2012 | Rabii | H04W 52/0254 361/679.01 |
| 2013/0257690 A1* | 10/2013 | Fujimaki | G02B 27/017 345/8 |
| 2014/0285404 A1* | 9/2014 | Takano | G06F 3/005 345/8 |
| 2015/0137938 A1* | 5/2015 | Slaby | G06F 21/32 340/5.53 |
| 2016/0098019 A1* | 4/2016 | Kirshenboim | H02P 6/16 318/650 |

FOREIGN PATENT DOCUMENTS

| JP | 2006-145616 A | 6/2006 |
| JP | 2006-229625 A | 8/2006 |
| JP | 2009-031295 A | 2/2009 |

* cited by examiner

*Primary Examiner* — Dmitriy Bolotin
(74) *Attorney, Agent, or Firm* — Oliff PLC

(57) ABSTRACT

A head-mounted display device worn on the body of a user includes a first sensor and a second sensor having different resolutions. The head-mounted display device includes a control section that switches detection values of the first sensor and the second sensor to perform processing and controls the head-mounted display device.

15 Claims, 7 Drawing Sheets

ELECTRONIC APPARATUS, DISPLAY DEVICE, AND CONTROL METHOD FOR ELECTRONIC APPARATUS

BACKGROUND

1. Technical Field

The present invention relates to an electronic apparatus, a display device, and a control method for the electronic apparatus.

2. Related Art

There has been known a device that detects a posture of an object such as a mobile body (see, for example, JP-A-2009-31295 (Patent Literature 1)). The device described in Patent Literature 1 calculates posture angles, translational positions, image postures, and the like of three axes on a space using output values of an acceleration sensor, an angular velocity sensor, and the like.

Incidentally, when a sensor having high resolution is used, the sensor can perform highly accurate detection. However, the sensor has disadvantageous characteristics that, for example, the sensor has a lot of noise and a narrow detectable range. For example, when a posture and a movement of a mobile body are detected as described in Patent Literature 1, since ranges of acceleration and angular velocity to be detected are wide, it is difficult to use a high-resolution sensor.

SUMMARY

An advantage of some aspects of the invention is to provide an electronic apparatus, a display device, and a control method for the electronic apparatus that can obtain a highly accurate detection result and perform processing even in a use in which a wide detection range is requested.

An aspect of the invention is directed to an electronic apparatus worn on the body of a user, the electronic apparatus including: a plurality of sensors having different resolutions; and a control section configured to switch a detection value of any one of the plurality of sensors to perform processing and control the electronic apparatus.

According to the aspect of the invention, since detection values of the plurality of sensors having the different resolutions are switched and used for processing, for example, it is possible to use an appropriate sensor according to requested accuracy and a requested detection range. Therefore, when detection concerning a movement of the body of the user is performed, it is possible to cover a wide detection range. It is possible to improve detection accuracy.

In the electronic apparatus according to the aspect of the invention, the electronic apparatus may include the plurality of sensors having different resolutions and detection ranges, and the control section may select any one of the plurality of sensors, execute the processing with a detection value of the selected sensors, select the high-resolution sensor among the plurality of sensors, and, when the processing cannot be executed with a detection value of the selected sensor, execute the processing with a detection value of another one of the sensors.

According to the aspect of the invention with this configuration, it is possible to select the sensor and execute the processing using a detection value of the selected sensor. When a detection value with which the processing cannot be executed is obtained, a detection value of another one of the sensors is used. Therefore, it is possible to prevent a lack and a delay of the processing.

In the electronic apparatus according to the aspect of the invention, the control section may be configured to execute a computer program and execute the processing and selects the sensor associated with the computer program to be executed among the plurality of sensors.

According to the aspect of the invention with this configuration, since the sensor corresponding to the computer program to be executed can be selected, it is possible to perform the processing using a detection value optimum for requested accuracy and a requested detection range in the execution of the computer program.

In the electronic apparatus according to the aspect of the invention, the control section may be configured to be capable of executing a plurality of functions respectively associated with selected sensors among the plurality of sensors.

According to the aspect of the invention with this configuration, since the sensor corresponding to a function to be executed can be selected, it is possible to perform the processing using a detection value optimum for requested accuracy and a requested detection range. In a multi-function electronic apparatus capable of executing a plurality of functions, it is possible to select an appropriate sensor for each of the functions.

In the electronic apparatus according to the aspect of the invention, when a detection value of the selected sensor is a value deviating from a detection range of the selected sensor, the control section may select another one of the sensors.

According to the aspect of the invention with this configuration, when the detection value deviates from the detection range, a detection value of another one of the sensors is used. Therefore, it is possible to prevent a lack and a delay of the processing.

In the electronic apparatus according to the aspect of the invention, the control section may select the high-resolution sensor among the plurality of sensors and, when a detection value of the selected sensor is a value deviating from a detection range of the selected sensor, select another one of the sensors.

According to the aspect of the invention with this configuration, it is possible to use a highly accurate detection value in a detection range of a high-resolution sensor. When the detection value deviates from the detection range, a detection value of another one of the sensors is used. Therefore, it is possible to prevent a lack and a delay of the processing.

In the electronic apparatus according to the aspect of the invention, the control section may acquire detection values of the plurality of sensors and select any one of the acquired detection values and performs the processing.

According to the aspect of the invention with this configuration, for example, when a measurement range is exceeded in the selected sensor, when accuracy of a value cannot be expected because of a limit of resolution, or when the selected sensor cannot be used, it is possible to quickly perform the processing using a detection value of another one of the sensors. Therefore, it is possible to prevent a lack and a delay of the processing.

In the electronic apparatus according to the aspect of the invention, the plurality of sensors may include at least an inertial sensor and an image pickup section.

According to the aspect of the invention with this configuration, it is possible to perform the processing using detection values of the inertial sensor and the image pickup section.

In the electronic apparatus according to the aspect of the invention, the electronic apparatus may include a main body, and the plurality of sensors may include a first inertial sensor provided in the main body and a second inertial sensor provided in the main body together with the first inertial sensor and having resolution different from resolution of the first inertial sensor.

According to the aspect of the invention with this configuration, detection values of the plurality of inertial sensors having different resolutions are switched and used for the processing. Therefore, for example, under a condition in which a detection range required of the inertial sensors is narrow, a detection value of the high-resolution inertial sensor resolution can be used for the processing. Therefore, when detection concerning a movement of the body of the user is performed, it is possible to cover a wide detection range. It is possible to improve detection accuracy.

In the electronic apparatus according to the aspect of the invention, the first and second inertial sensors may be mounted on the same substrate disposed in the main body.

According to the aspect of the invention with this configuration, the plurality of inertial sensors can perform detection concerning a movement under the same condition. There is an advantage that an error involved in switching of the inertial sensors less easily occurs.

In the electronic apparatus according to the aspect of the invention, the main body may be worn on the head of the user.

According to the aspect of the invention with this configuration, it is possible to perform detection in a wide range concerning a movement of the head. Therefore, for example, even when the user slowly moves the body, even when a movement is intense, it is possible to perform the detection, for example, when the body of the user is moved by a mobile body.

In the electronic apparatus according to the aspect of the invention, the main body has a shape stretchable in the left-right direction of the user in a state in which the main body is worn on the head of the user, and the first and second inertial sensors may be disposed in the center in the left-right direction of the main body.

According to the aspect of the invention with this configuration, concerning a movement of the head of the user, it is possible to perform detection near a position where the user feels the movement of the head.

In the electronic apparatus according to the aspect of the invention, each of the first and second inertial sensors may be configured by a sensor that detects at least one of acceleration and angular velocity on one or a plurality of axes, and an axis of detection of the first inertial sensor and an axis of detection of the second inertial sensor may be associated.

According to the aspect of the invention with this configuration, since the axes of detection of the plurality of sensors are associated, when the inertial sensors are switched, it is possible to easily switch processing performed using detection values. It is possible to efficiently perform the processing.

Another aspect of the invention is directed to a display device including: a display section worn on the head of a user and configured to display an image; a plurality of sensors having different resolutions; and a control section configured to switch a detection value of any one of the plurality of sensors to perform processing and control display in the display section according to the processing.

According to the aspect of the invention, detection values of the plurality of sensors having the different resolutions are switched and used for processing for controlling display. Therefore, for example, when an appropriate sensor is used according to requested accuracy and a requested detection range and detection concerning a movement of the body of the user is performed, it is possible to cover a wide detection range and improve detection accuracy. Consequently, it is possible to appropriately control the display according to the movement of the body of the user.

In the display device according to the aspect of the invention, that the display section may have a configuration for displaying the image while enabling the user to visually recognize an outside scene, and the control section may associate the outside scene and a display region by the display section according to the processing performed using the detection values of the sensors.

According to the aspect of the invention with this configuration, it is possible to associate, on the basis of the detection values of the plurality of sensors having the different resolutions, the outside scene visually recognized by the user and a region in which the image is displayed.

Still another aspect of the invention is directed to a control method for an electronic apparatus including switching, for an electronic apparatus worn on the body of a user and including a plurality of sensors having different resolutions, a detection value of any one of the plurality of sensors to perform processing and controlling the electronic apparatus.

According to the aspect of the invention, since detection values of the plurality of sensors having the different resolutions are switched and used for processing, for example, it is possible to use an appropriate sensor according to requested accuracy and a requested detection range. Therefore, when detection concerning a movement of the body of the user is performed, it is possible to cover a wide detection range. It is possible to improve detection accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
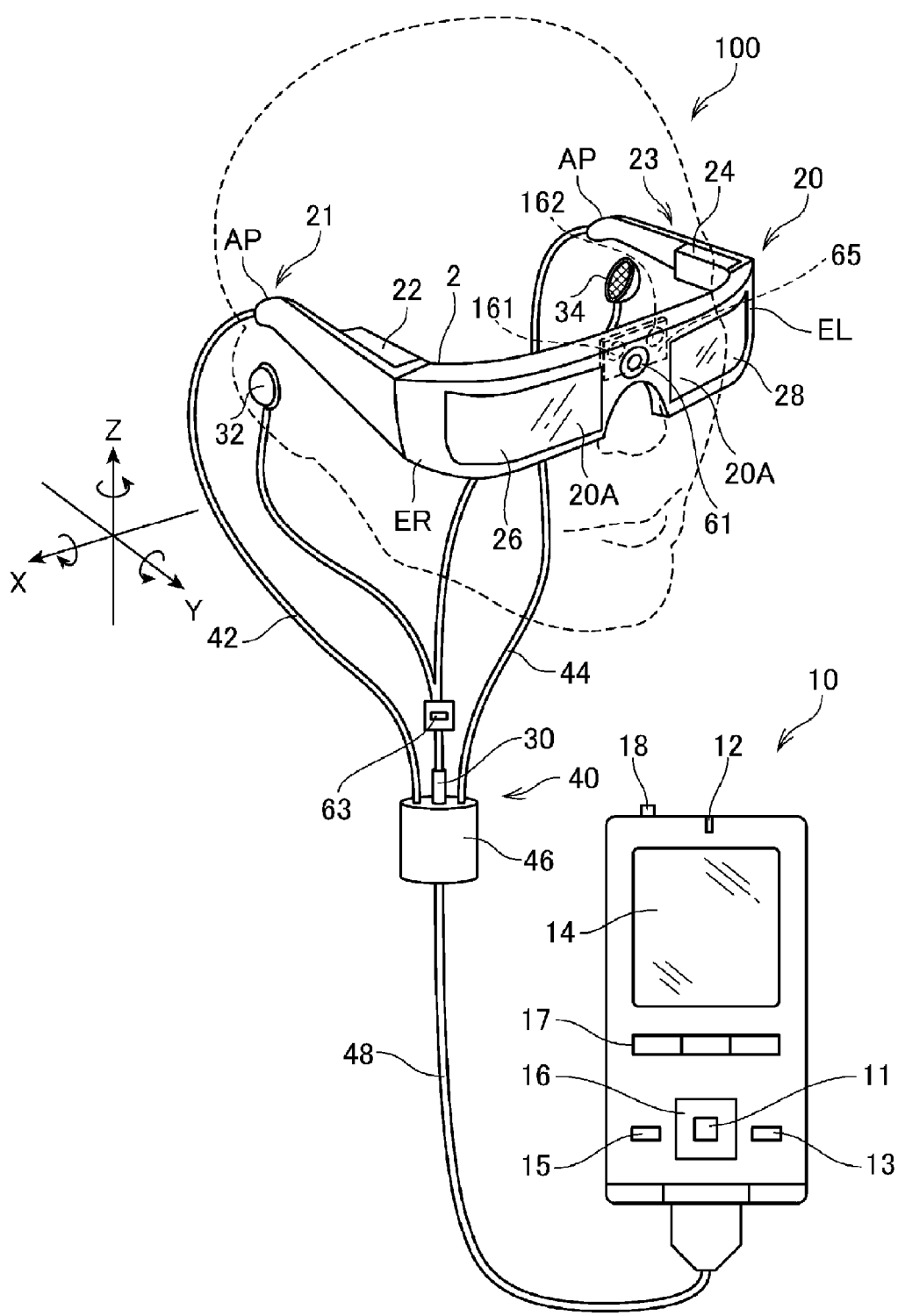
FIG. 1 is an explanatory diagram showing the exterior configuration of a head-mounted display device.

FIG. 1 is an explanatory diagram showing the exterior configuration of a head-mounted display device 100 (an electronic apparatus and a display device) according to an embodiment applied with the invention.

The head-mounted display device 100 includes an image display section 20 (a display section) that causes a user to visually recognize a virtual image in a state in which the image display section 20 is worn on the head of the user and a control device 10 that controls the image display section 20. The control device 10 also functions as a controller with which the user operates the head-mounted display device 100.

The image display section 20 is a wearing body worn on the head of the user. In this embodiment, the image display section 20 includes a frame 2 (a main body) of an eyeglass shape.

The frame 2 includes a right holding section 21 and a left holding section 23. The right holding section 21 is a member provided to extend from an end portion ER, which is the other end of a right optical-image display section 26, to a position corresponding to the temporal region of the user when the user wears the image display section 20. Similarly, the left holding section 23 is a member provided to extend from an end portion EL, which is the other end of a left optical-image display section 28, to a position corresponding to the temporal region of the user when the user wears the image display section 20. The right holding section 21 is in contact with the right ear or the vicinity of the right ear in the head of the user and the left holding section 23 is in contact with the left ear of the user or the vicinity of the left ear. The right holding section 21 and the left holding section 23 hold the image display section 20 on the head of the user. The right holding section 21 and the left holding section 23 hold the image display section 20 on the head of the user like temples of eyeglasses.

In this embodiment, as an example of the main body, the frame 2 of the eyeglass shape is illustrated. The shape of the main body is not limited to the eyeglass shape and only has to be worn on and fixed to the head of the user. The main body more desirably has a shape worn across in front of the left and right eyes of the user. For example, besides the eyeglass shape explained above, the main body may have a shape like snow goggles that cover an upper part of the face of the user or may be a shape like a binocular disposed in front of the respective left and right eyes of the user.

In the frame 2, a right display driving section 22, a left display driving section 24, the right optical-image display section 26, the left optical-image display section 28, and a microphone 63 are provided. The right display driving section 22 and the left display driving section 24 are disposed on a side opposed to the head of the user when the user wears the image display section 20. The right optical-image display section 26 and the left optical-image display section 28 are respectively disposed to be located in front of the right and left eyes of the user when the user wears the image display section 20. One end of the right optical-image display section 26 and one end of the left optical-image display section 28 are coupled to each other in a position corresponding to the middle of the forehead of the user when the user wears the image display section 20. Note that the right display driving section 22 and the left display driving section 24 are collectively simply referred to as "display driving sections" as well. The right optical-image display section 26 and the left optical-image display section 28 are collectively simply referred to as "optical-image display sections" as well.

The display driving sections 22 and 24 include liquid crystal displays 241 and 242 (hereinafter referred to as "LCDs 241 and 242") and projection optical systems 251 and 252 explained below with reference to FIG. 2.

The right optical-image display section 26 and the left optical-image display section 28 include light guide plates 261 and 262 (FIG. 2) and dimming plates 20A. The light guide plates 261 and 262 are formed of light-transmissive resin or the like and guide image lights output by the display driving sections 22 and 24 to the eyes of the user. The dimming plates 20A are thin plate-like optical elements and are disposed to cover the front side of the image display section 20, which is a side opposite to the side of the eyes of the user. As the dimming plates 20A, various dimming plates such as a dimming plate having almost no light transmissivity, a dimming plate nearly transparent, a dimming plate that attenuates a light amount and transmits light, and a dimming plate that attenuates or reflects light having a specific wavelength can be used. By selecting optical characteristics (light transmittance, etc.) of the dimming plates 20A as appropriate, it is possible to adjust an amount of external light made incident on the right optical-image display section 26 and the left optical-image display section 28 from the outside and adjust easiness of visual recognition of a virtual image. In this embodiment, the dimming plates 20A at least having light transmissivity enough for enabling the user wearing the head-mounted display device 100 to visually recognize an outside scene are used. The dimming plates 20A protect the right light guide plate 261 and the left light guide plate 262 and suppress damage, adhesion of stain, and the like to the right light guide plate 261 and the left light guide plate 262.

The dimming plates 20A may be detachably attachable to the right optical-image display section 26 and the left optical-image display section 28. A plurality of kinds of dimming plates 20A may be replaceable and attachable. The dimming plates 20A may be omitted.

A sensor board 65 is provided in the frame 2. The sensor board 65 is a board mounted with a first sensor 161 (a first inertial sensor) and a second sensor 162 (a second inertial sensor), which are inertial sensors. The sensor board 65 is housed in a boundary portion between the right optical-image display section 26 and the left optical-image display section 28 of the frame 2 and fixed on the inside of the frame 2.

A camera 61 is mounted on the sensor board 65. The camera 61 is exposed in the boundary portion between the right optical-image display section 26 and the left optical-image display section 28. In a state in which the user wears the image display section 20, the position of the camera 61 is substantially the middle of both the eyes of the user in the horizontal direction and is above both the eyes of the user in the vertical direction. The camera 61 is a digital camera including an image pickup device such as a CCD or a CMOS and an image pickup lens and may be either a monocular camera or a stereo camera.

The sensor board 65 may be configured by one printed board or may be configured by a flexible board. The sensor board 65 may be configured by connecting a plurality of boards via flexible cables, connectors, or sockets. In the sensor board 65, relative positions of the first sensor 161 and the second sensor 162 are desirably fixed to each other.

The camera 61 picks up an image of at least a part of an outside scene in a front side direction of the head-mounted display device 100, in other words, in a visual field direction of the user in a state in which the head-mounted display device 100 is mounted. The breadth of an angle of view of the camera 61 can be set as appropriate. However, the angle of view of the camera 61 is desirably an angle of view including an outside world that the user visually recognizes through the right optical-image display section 26 and the left optical-image display section 28. Further, an image pickup range of the camera 61 is more desirably set such that an image of the entire visual field of the user through the dimming plates 20A can be picked up. Adjustment of the angle of view of the camera 61 can be set as appropriate according to adjustment of an optical axis of an image pickup lens (not shown in the figure), selection of an angle of view of a lens, and the like.

Figure 2:
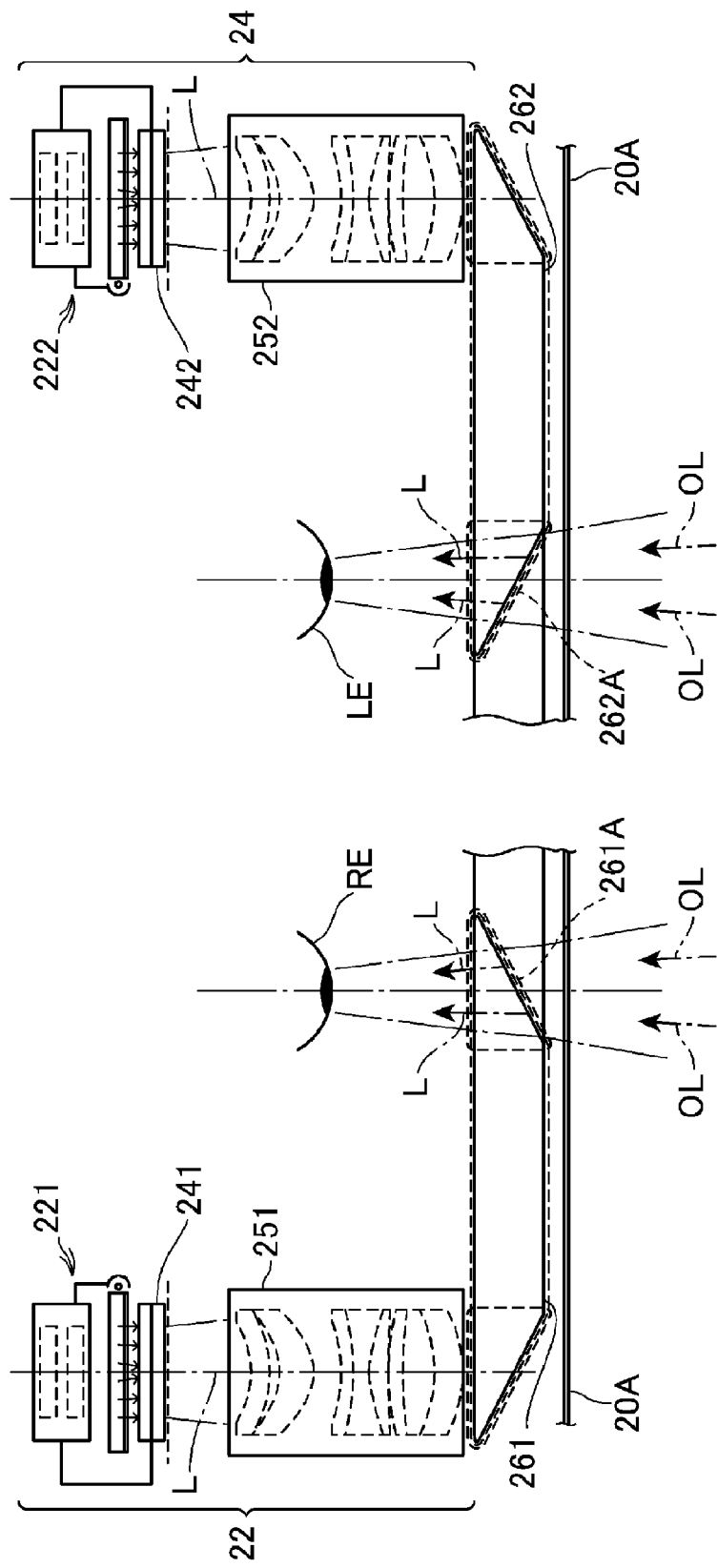
FIG. 2 is a diagram showing the configuration of an optical system of an image display section.

FIG. 2 is a main part plan view showing the configuration of an optical system included in the image display section 20. A left eye LE and a right eye RE of the user are shown in FIG. 2 for explanation.

The left display driving section 24 includes a left backlight 222 including a light source such as an LED and a diffuser. The left display driving section 24 includes the transmissive left LCD 242 of a transmission type disposed on an optical path of light diffused by the diffuser of the left backlight 222 and a left projection optical system 252 including a lens group and the like that guide image light L transmitted through the left LCD 242. The left LCD 242 is a transmissive liquid crystal panel on which a plurality of pixels are arranged in a matrix shape.

The left projection optical system 252 includes a collimate lens that changes the image light L emitted from the left LCD 242 to light beams in a parallel state. The image light L changed to the light beams in the parallel state by the collimate lens is made incident on the left light guide plate 262 (an optical element). The left light guide plate 262 is a prism on which a plurality of reflection surfaces for reflecting the image light L are formed. The image light L is guided to the left eye LE side through a plurality of times of reflection on the inside of the left light guide plate 262. On the left light guide plate 262, a half mirror 262A (a reflection surface) located in front of the left eye LE is formed.

The image light L reflected on the half mirror 262A is emitted from the left optical-image display section 28 toward the left eye LE. The image light L forms an image on the retina of the left eye LE and causes the user to visually recognize an image.

The right display driving section 22 is configured symmetrically to the left display driving section 24. The right display driving section 22 includes a right backlight 221 including a light source such as an LED and a diffuser. The right display driving section 22 includes the right LCD 241 of the transmission type disposed on an optical path of light diffused by the diffuser of the right backlight 221 and a right projection optical system 251 including a lens group and the like that guide the image light L transmitted through the right LCD 241. The right LCD 241 is a transmissive liquid crystal panel on which a plurality of pixels are arranged in a matrix shape.

The right projection optical system 251 includes a collimate lens that changes the image light L emitted from the right LCD 241 to light beams in a parallel state. The image light L changed to the light beams in the parallel state by the collimate lens is made incident on the right light guide plate 261 (an optical element). The right light guide plate 261 is a prism on which a plurality of reflection surfaces for reflecting the image light L are formed. The image light L is guided to the right eye RE side through a plurality of times of reflection on the inside of the right light guide plate 261. On the right light guide plate 261, a half mirror 261A (a reflection surface) located in front of the right eye RE is formed.

The image light L reflected on the half mirror 261A is emitted from the right optical-image display section 26 toward the right eye RE. The image light L forms an image on the retina of the right eye RE and causes the user to visually recognize an image.

The image light L reflected on the half mirror 261A and external light OL transmitted through the dimming plate 20A are made incident on the right eye RE of the user. The image light L reflected on the half mirror 262A and the external light OL transmitted through the dimming plate 20A are made incident on the left eye LE. In this way, the head-mounted display device 100 makes the image light L of the image processed on the inside and the external light OL incident on the eyes of the user to be placed one on top of the other. For the user, the outside scene is seen through the dimming plates 20A. The image formed by the image light L is visually recognized over the outside scene. In this way, the head-mounted display device 100 functions as a see-through type display device.

Note that the left projection optical system. 252 and the left light guide plate 262 are collectively referred to as "left light guide section" as well. The right projection optical system 251 and the right light guide plate 261 are collectively referred to as "right light guide section" as well. The configuration of the right light guide section and the left light guide section is not limited to the example explained above. Any system can be used as long as a virtual image is formed in front of the eyes of the user using image light. For example, a diffraction grating may be used or a transreflective film may be used.

The image display section 20 (FIG. 1) is connected to the control device 10 via a connecting section 40. The connecting section 40 is a harness including a main body cord 48 connected to the control device 10, a right cord 42, a left cord 44, and a coupling member 46. The right cord 42 and the left cord 44 are two cords branching from the main body cord 48. The right cord 42 is inserted into a housing of the right holding section 21 from a distal end portion AP in an extending direction of the right holding section 21 and connected to the right display driving section 22. Similarly, the left cord 44 is inserted into a housing of the left holding section 23 from a distal end portion AP in an extending direction of the left holding section 23 and connected to the left display driving section 24. The right cord 42, the left cord 44, and the main body cord 48 only have to be cords capable of transmitting digital data and can be configured by, for example, a metal cable or an optical fiber. The right cord 42 and the left cord 44 may be collected as one cord.

The coupling member 46 is provided at a branching point of the main body cord 48 and the right and left cords 42 and 44 and includes a jack for connecting an earphone plug 30. A right earphone 32 and a left earphone 34 extend from the earphone plug 30. The microphone 63 is provided in the vicinity of the earphone plug 30. Cords between the earphone plug 30 and the microphone 63 are collected as one cord. Cords branch from the microphone 63 and are respectively connected to the right earphone 32 and the left earphone 34.

For example, as shown in FIG. 1, the microphone 63 is disposed to direct a sound collecting section of the microphone 63 to a visual line direction of the user. The microphone 63 collects sound and outputs a sound signal. The microphone 63 may be, for example, a monaural microphone or a stereo microphone, may be a microphone having directivity, or may be a nondirectional microphone.

The image display section 20 and the control device 10 transmit various signals via the connecting section 40. Connectors (not shown in the figure), which fit with each other, are respectively provided at an end portion on the opposite side of the coupling member 46 of the main body cord 48 and in the control device 10. The control device 10 and the image display section 20 can be connected and disconnected by fitting and unfitting the connector of the main body cord 48 and the connector of the control device 10.

The control device 10 includes a box-shaped main body separate from a main body of the image display section 20 and controls the head-mounted display device 100. The control device 10 includes a determination key 11, a lighting section 12, a display switching key 13, a luminance switching key 15, a direction key 16, a menu key 17, and switches including a power switch 18. The control device 10 includes a track pad 14 operated by the user with a finger.

The determination key 11 detects depression operation and outputs a signal for determining content of the operation in the control device 10. The lighting section 12 includes a light source such as an LED (Light Emitting Diode) and notifies an operation state (e.g., ON/OFF of a power supply) of the head-mounted display device 100 according to a lighting state of the light source. The display switching key 13 outputs, according to depression operation, for example, a signal for instructing switching of a display mode of an image.

The track pad 14 includes an operation surface for detecting contact operation and outputs an operation signal according to operation on the operation surface. A detection system on the operation surface is not limited. An electrostatic system, a pressure detection system, an optical system, and the like can be adopted. The luminance switching key 15 outputs, according to depression operation, a signal for instructing an increase or a reduction of the luminance of the image display section 20. The direction key 16 outputs operation signals according to depression operation on the keys corresponding to the upward, downward, left, and right directions. The power switch 18 is a switch for switching power ON/OF of the head-mounted display device 100.

Figure 3:
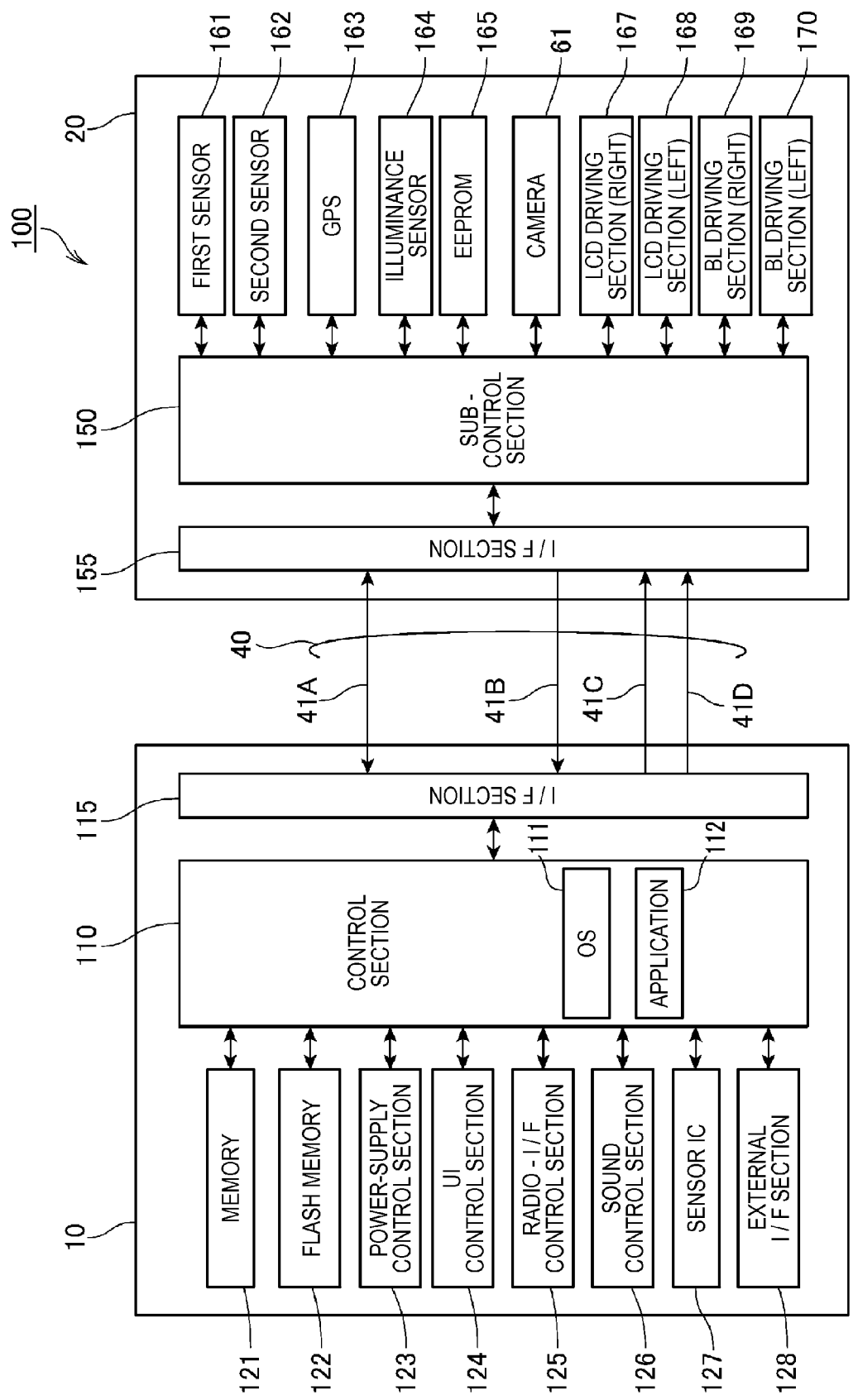
FIG. 3 is a functional block diagram of sections configuring the head-mounted display device.

FIG. 3 is a functional block diagram of the sections configuring the head-mounted display device 100.

The control device 10 includes a control section 110 (a second control section) that controls the control device 10 and the image display section 20. The control section 110 is configured by, for example, a microprocessor and is connected to a memory 121 that temporarily stores data and the like processed by the control section 110 and a flash memory 122 that stores, in a nonvolatile manner, data and the like processed by the control section 110. Both of the memory 121 and the flash memory 122 are configured by semiconductor elements and are connected to the control section 110 via a data bus.

A power-supply control section 123, a UI (user interface) control section 124, a radio-I/F (interface) control section 125, a sound control section 126, a sensor IC 127, and an external I/F (interface) section 128 are connected to the control section 110.

The head-mounted display device 100 includes a primary battery or a secondary battery as a power supply. The power-supply control section 123 is configured by an IC connected to the battery. The power-supply control section 123 performs detection of the residual capacity of the battery according to the control by the control section 110 and outputs, to the control section 110, data of detection values or data indicating that the residual capacity is equal to or smaller than a setting value.

The UI control section 124 is an IC to which the operation sections including the determination key 11, the display switching key 13, the track pad 14, the luminance switching key 15, the direction key 16, and the menu key 17, the lighting section 12, and the track pad 14 are connected. The operation sections function as input sections. The lighting section 12 and the track pad 14 function as output sections. The operation sections and the lighting section 12 and the track pad 14 configure a user interface of the head-mounted display device 100. The UI control section 124 detects operation in the operation sections and outputs operation data corresponding to the operation to the control section 110. The UI control section 124 performs, according to the control by the control section 110, lighting/extinction of the lighting section 12 and display in the track pad 14.

The radio-I/F control section 125 is a control IC connected to a radio communication interface (not shown in the figure). The radio-I/F control section 125 executes communication by the radio communication interface according to the control by the control section 110. The radio communication interface included in the control device 10 executes radio data communication conforming to a standard such as a wireless LAN (WiFi (registered trademark)), Miracast (registered trademark), or Bluetooth (registered trademark).

The sound control section 126 is an IC connected to the right earphone 32, the left earphone 34, and the microphone 63 and including an A/D (analog/digital) converter and an amplifier. The sound control section 126 causes, on the basis of sound data input from the control section 110, the right earphone 32 and the left earphone 34 to output sound. The sound control section 126 generates sound data on the basis of sound collected by the microphone 63 and outputs the sound data to the control section 110.

The sensor IC 127 includes, for example, a three-axis acceleration sensor, a three-axis gyro sensor, and a three-axis terrestrial magnetism sensor. The sensor IC 127 is configured by one IC including the sensors. The sensor IC 127 executes detection according to the control by the control section 110 and outputs data indicating detection values of the sensors to the control section 110. The number and the types of the sensors included in the sensor IC 127 are not limited. The sensor IC 127 may include an illuminance sensor, a temperature sensor, and a pressure sensor.

The external I/F section 128 is an interface for connecting the head-mounted display device 100 to an external apparatus. For example, an interface corresponding to wired connection such as a USB interface, a micro USB interface, or an interface for a memory card can be used. The external I/F section 128 may be configured by a radio communication interface. Various external apparatuses that supply contents to the head-mounted display device 100 can be connected to the external I/F section 128. The external apparatuses can also be referred to as image supply apparatuses that supply images to the head-mounted display device 100. For example, a personal computer (PC), a cellular phone terminal, a portable game machine, and the like are used. Terminals connected to the right earphone 32, the left earphone 34, and the microphone 63 can also be provided in the external I/F section 128. In this case, an analog sound signal processed by the sound control section 126 is input and output via the external I/F section 128.

An I/F (interface) section 115 is connected to the control section 110. The I/F section 115 is an interface including a connector or the like connected to one end of the connecting section 40. The other end of the connecting section 40 is connected to an I/F section 155 of the image display section 20.

The control section 110 executes, via the connecting section 40, data communication with a sub-control section 150 included in the image display section 20.

The control section 110 includes a CPU that executes computer programs and a ROM that stores the computer programs, setting data, and the like. The control section 110 executes, with the CPU, the computer programs stored in the ROM and controls the sections of the head-mounted display device 100. For example, the control section 110 executes an operating system (OS) 111 and an application 112. The operating system 111 is a general-purpose operating system. Examples of the operating system of this type include Windows (registered trademark), iOS (registered trademark), Android (registered trademark), Mac OS (registered trademark), Linux (registered trademark), Unix (registered trademark), and Tron (registered trademark). These general-purpose operating systems may be partially modified to be used in the head-mounted display device 100.

The application 112 is a computer program operating on the operating system 111 to execute a specific function. The application 112 sometimes includes an interface different from an interface provided by the operating system 111. When the control section 110 executes the application 112, the UI control section 124 realizes a user interface of the application 112.

The control section 110 acquires detection values of the sensors on the basis of data input from the sensor IC 127 and stores the detection values in the memory 121. At this point, the control section 110 adds, to the detection values of the sensor, time stamp information indicating time when the detection values are acquired and stores the time stamp information in association with the detection values.

The control section 110 receives, via the connecting section 40, data indicating detection values of the sensors (the first sensor 161, the second sensor 162, a GPS 163, and an illuminance sensor 164) included in the image display section 20. The control section 110 stores the received data in the memory 121. The data received by the control section 110 includes time stamp information added by the sub-control section 150. The control section 110 adds, in a form distinguishable from the time stamp information added by the sub-control section 150, the time stamp information added to the detection values of the sensor IC 127 as explained above, and stores the time stamp information in the memory 121. In the memory 121, the detection values of the sensors are stored in a data format added with the time stamp information as one of attributes of the data. The control section 110 may store the data of the detection values of the sensors in the flash memory 122.

The control section 110 receives data of contents from an external apparatus connected by the external I/F section 128 or the radio I/F control section 125 and stores the data in the flash memory 122. The data of the contents is data such as a text or an image to be displayed on the image display section 20 and may include data of sound to be output by the right earphone 32 and the left earphone 34. The control section 110 controls the head-mounted display device 100 and reproduces the contents. Specifically, the control section 110 transmits data for display of the contents to the sub-control section 150, causes the sub-control section 150 to execute display, outputs sound data of the contents to the sound control section 126, and causes the sound control section 126 to output sound. When the data of the contents received from the external apparatus includes data indicating a condition concerning reproduction, the control section 110 reproduces the contents according to this condition. For example, when a detection value of a sensor for a position, a tilt, or the like detected in the image display section 20 corresponds to the condition, the control section 110 causes the image display section 20 to display a text and an image corresponding to the detection value. An operation for reproducing the contents may be executed as a function of the application 112 for content reproduction.

The image display section 20 includes the sub-control section 150 that executes communication with the control section 110 and controls the sections of the image display section 20. The sub-control section 150 is configured by, for example, a microprocessor and connected to the connecting section 40 by the I/F section 155. The sub-control section 150 executes data communication with the control section 110 via the connecting section 40.

Sensors such as the first sensor 161, the second sensor 162, the GPS 163, and the illuminance sensor 164 are connected to the sub-control section 150.

The first sensor 161 and the second sensor 162 are the inertial sensors as explained above. Specifically, the first sensor 161 and the second sensor 162 are acceleration sensors, angular velocity sensors (gyros), and the like. The first sensor 161 and the second sensor 162 may be respectively single sensors or may be units of different kinds of pluralities of sensors.

In this embodiment, the first sensor 161 and the second sensor 162 are respectively configured by composite sensor ICs including three-axis acceleration sensors and three-axis angular velocity sensors.

Axes on which the first sensor 161 and the second sensor 162 detect acceleration and angular velocity are shown in FIG. 1. That is, the left-right direction with respect to the head of the user wearing the image display section 20 is represented as an X axis, the front-back direction with respect to the head is represented as a Y axis, and the up-down direction with respect to the head is represented as a Z axis. More specifically, in a mounted state of the head-mounted display device 100, the image display section 20 is present in a horizontal position perceived by the user with respect to the left and right eyes of the image display section 20. In this mounted state, the detection axes (the X axis, the Y axis, and the Z axis) of the first sensor 161 and the second sensor 162 coincide with the left and right, the front and back, and the up and down perceived by the user. If a wearing position of the image display section 20 tilts or shifts with respect to the head of the user, the detection axes of the first sensor 161 and the second sensor 162 shift from the left and right, the front and back, and the up and down. However, this problem is easily solved by user adjusting the tilt or the shift of the image display section 20.

The acceleration sensors included in the first sensor 161 and the second sensor 162 detect accelerations in the X-axis direction, the Y-axis direction, and the Z-axis direction. The angular velocity sensors included in the first sensor 161 and the second sensor 162 detect rotation around the X axis (a pitch), rotation around the Y axis (a yaw), and rotation around the Z axis (a roll).

The first sensor 161 and the second sensor 162 respectively output a detection value of the acceleration sensors and a detection value of the angular velocity sensors to the sub-control section 150 as output values. The sub-control section 150 transmits the respective output values of the first sensor 161 and the second sensor 162 to the control section 110.

The first sensor 161 and the second sensor 162 can output the detection values of one of the acceleration sensors and the angular velocity sensor. The control section 110 can transmit control data to the first sensor 161 or the second sensor 162 via the sub-control section 150 and designate an operating sensor. The control section 110 can individually shift the first sensor 161 and the second sensor 162 to a sleep state. The sleep state is a state in which detection of acceleration and angular velocity is not performed and reception of the control data input from the sub-control section 150 is possible. Compared with a normal operation state, power consumption is low. When receiving control data for instructing a shift to a normal operation in the sleep state, the first sensor 161 and the second sensor 162 return to the normal operation. In the normal operation, the first sensor 161 and the second sensor 162 output detection values at a predetermined sampling cycle (a sampling frequency). The control section 110 can individually set the sampling frequency in the normal operation of the first sensor 161 and the second sensor 162. Power consumption is lower as the sampling frequency is longer and the number of times of sampling per unit time is fewer. Therefore, for power saving, the control section 110 may set or change the sampling frequency.

Both of the first sensor 161 and the second sensor 162 are sensors of the same type capable of detecting acceleration and angular velocity. The first sensor 161 has high detection resolution compared with the second sensor 162. More specifically, the first sensor 161 has resolution higher than resolution of the second sensor 162 concerning detection of acceleration and detection of angular velocity. On the other hand, the first sensor 161 has a detection range (a measurement range) narrower than a detection range (a measurement range) of the second sensor 162 concerning detection of acceleration and detection of angular velocity. In other words, the second sensor 162 has the resolution lower than the resolution of the first sensor 161 and has the detection range wider than the detection range of the first sensor 161.

The GPS 163 receives a signal for position detection transmitted by a GPS satellite or a pseudo GPS transmitter (not shown in the figure) set indoors, calculates the present position of the image display section 20, and outputs the calculated data to the sub-control section 150. The GPS 163 may be configured to have only a function of a receiver that receives the signal for position detection. In this case, the sub-control section 150 only has to perform processing for calculating the present position on the basis of the data output by the GPS 163.

The illuminance sensor 164 is set to be embedded in the frame 2. The illuminance sensor 164 receives external light from the visual field direction of the user wearing the image display section 20 and outputs a detection value of an amount of the received light to the sub-control section 150.

An EEPROM 165 stores, in a nonvolatile manner, data and the like concerning processing executed by the sub-control section 150.

An LCD driving section 167 that drives the right LCD 241 to perform rendering and an LCD driving section 168 that drives the left LCD 242 to perform rendering are connected to the sub-control section 150. The sub-control section 150 receives data of contents from the control section 110, generates display data for displaying a text and an image included in the received data, outputs the display data to the LCD driving sections 167 and 168, and causes the LCD driving sections 167 and 168 to execute display.

The sub-control section 150 is connected to a backlight driving section 169 that drives the right backlight 221 and a backlight driving section 170 that drives the left backlight 222. The sub-control section 150 outputs control data including timing data for PWM control to the backlight driving sections 169 and 170. The backlight driving sections 169 and 170 supply, on the basis of the control data input from the sub-control section 150, driving voltages and pulses to the right backlight 221 and the left backlight 222 and light the right backlight 221 and the left backlight 222.

The sub-control section 150 designates, according to the data output to the backlight driving section 169, pulse width or duty of a pulse output to the right backlight 221 by the backlight driving section 169. The duty indicates a ratio of an ON period and an OFF period of the pulse. Similarly, the sub-control section 150 designates, according to the data output to the backlight driving section 170, pulse width or duty of a pulse output to the left backlight 222 by the backlight driving section 170. The right backlight 221 and the left backlight 222 are solid-state light sources such as LEDs and can adjust brightness, that is, luminance of light emission according to PWM control. Therefore, it is possible to adjust, according to the control by the sub-control section 150, alight amount of the image light L (FIG. 2) made incident on the eyes of the user.

The sub-control section 150 can output different data respectively to the backlight driving section 169 and the backlight driving section 170 and individually adjust the luminance of the right backlight 221 and the luminance of the left backlight 222. The sub-control section 150 outputs data for designating the luminance of the right backlight 221 and the luminance of the left backlight 222 respectively to the backlight driving sections 169 and 170. The backlight driving sections 169 and 170 generate pulses corresponding to luminance values designated by the data input from the sub-control section 150 and output the pulses respectively to the left backlight 221 and the left backlight 222.

The connecting section 40 that connects the control section 110 and the sub-control section 150 includes a plurality of data buses including a control data bus 41A, an image data bus 41B, and display data buses 41C and 41D. The data buses can transmit data independently from one another. However, signal lines configuring the data buses may be physically divided or the data buses may be virtually or logically configured using a common signal line.

The control data bus 41A transmits the control data transmitted from the control section 110 to the sub-control section 150, the data of the detection values of the sensors transmitted to the control section 110 by the sub-control section 150, and the like. The image data bus 41B transmits the picked-up image data of the camera 61 from the sub-control section 150 to the control section 110. The display data bus 41C transmits data to be displayed by the right display driving section 22. The display data bus 41D transmits data to be displayed by the left display driving section 24.

Sampling cycles of a plurality of sensors including the first sensor 161, the second sensor 162, the GPS 163, and the illuminance sensor 164 included in the image display section 20 are sometimes greatly different from one another. For example, it is conceivable that a sampling cycle (a sampling frequency) of the acceleration sensors included in the first sensor 161 and the second sensor 162 is 200 times/second or more. On the other hand, it is conceivable that a sampling cycle of the illuminance sensor 164 is lower and the illuminance sensor 164 is sufficiently useful at a sampling cycle of approximately 1 to 10 times/second (a 1000 to 100 ms cycle). The sub-control section 150 sets sampling cycles of these sensors. The sub-control section 150 acquires detection values of the sensors according to the set sampling cycles. The sub-control section 150 transmits data of the detection values sampled from the sensors to the control section 110 in a time division manner through the control data bus 41A.

Therefore, the control data bus 41A is not occupied for a long time in order to control a sensor having a low sampling cycle (in other words, having a low sampling frequency or a long sampling interval). Consequently, it is possible to reduce an overhead of the control data bus 41A and efficiently transmit detection values of a large number of sensors through the control data bus 41A. The sub-control section 150 incorporates a RAM (not shown in the figure)

and, when detection values of the sensors are acquired, temporarily stores the detection values in the RAM. The sub-control section 150 adjusts transmission timing of data stored in the RAM and delivers the data to the control data bus 41A. Therefore, the operation of the sub-control section 150 is less easily affected by limitation of the sampling cycles of the sensors. It is possible to prevent a situation in which the processing by the sub-control section 150 is occupied for the control of the sensors.

Figure 4A:
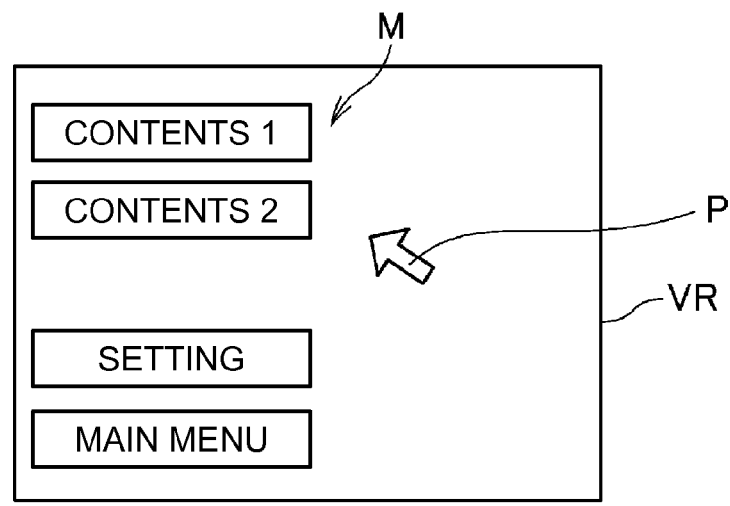
FIGS. 4A and 4B are diagrams showing display examples in the head-mounted display device.
Figure 4B:
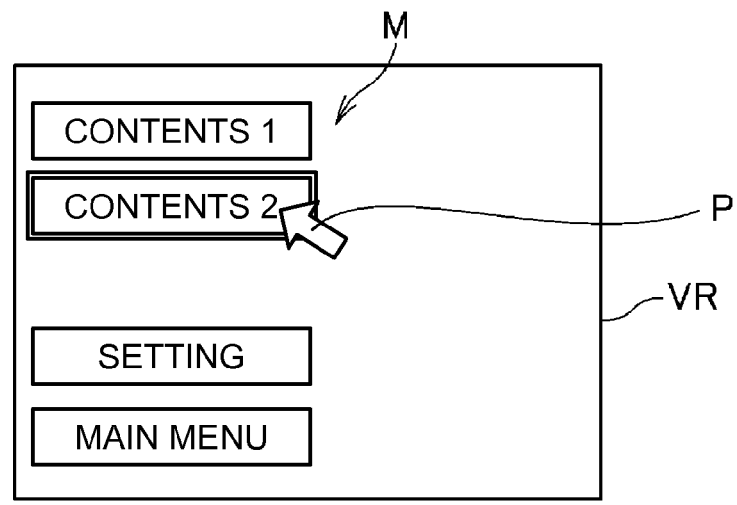

FIGS. 4A and 4B are diagrams showing examples of the operation of the head-mounted display device 100. Examples in which the control section 110 processes output values of the first sensor 161 and the second sensor 162 are shown in the figures.

In FIGS. 4A and 4B, examples in which the control section 110 detects position indicating operation on the basis of an output value of the first sensor 161 or the second sensor 162 are shown. FIG. 4A shows a state of operation for moving a pointer. FIG. 4B shows a state in which a candidate selected by the pointer is decided.

In the example shown in FIG. 4A, a menu screen M including a plurality of menu items is displayed in a visual field VR of the user. The menu screen M is displayed when the control section 110 transmits display data to the sub-control section 150 and the sub-control section 150 controls the LCD driving section 167 and the LCD driving section 168 on the basis of the display data.

In a state in which the menu screen M shown in FIG. 4A is displayed, the control section 110 moves a pointer P on the basis of an output value of one of the first sensor 161 and the second sensor 162. Therefore, when the user wearing the image display section 20 on the head moves the head, the pointer P is moved according to a detection value of an acceleration sensor or a detection value of an angular velocity sensor concerning the movement of the head. For example, the control section 110 associates an output value of an acceleration sensor in the X-axis direction shown in FIG. 1 with a movement amount of the pointer P in the lateral direction of the visual field VR and associates an output value of an acceleration sensor in the Z-axis direction with a movement amount of the pointer P in the longitudinal direction of the visual field VR.

In FIG. 4B, a state in which one of the menu items arranged on the menu screen M is selected by the pointer P is shown. In this state, the control section 110 decides the selection of the menu item on the basis of an output value of the acceleration sensor or the angular velocity sensor of the first sensor 161 or the second sensor 162. For example, when the output value of the acceleration sensor or the output value of the angular velocity sensor exceeds a threshold set in advance, the control section 110 decides the selection of the menu item.

As illustrated in FIGS. 4A and 4B, the control section 110 can process output values of the first sensor 161 and the second sensor 162 as a user interface, that is, input operation by the user.

As explained above, the first sensor 161 and the second sensor 162 have the characteristic that the first sensor 161 has the high resolution and the narrow range compared with the second sensor 162. Therefore, in a configuration in which the control section 110 always acquires the output value of the first sensor 161, an input of large acceleration or angular velocity cannot be detected. On the other hand, if the control section 110 always acquire the output value of the second sensor 162, since the resolution is low, it is difficult to detect delicate operation. There is a limit in operability.

Therefore, the control section 110 selects the output values of the first sensor 161 and the second sensor 162 as appropriate to perform appropriate processing in terms of both of resolution and a detection range. This operation is explained below.

Figure 5:
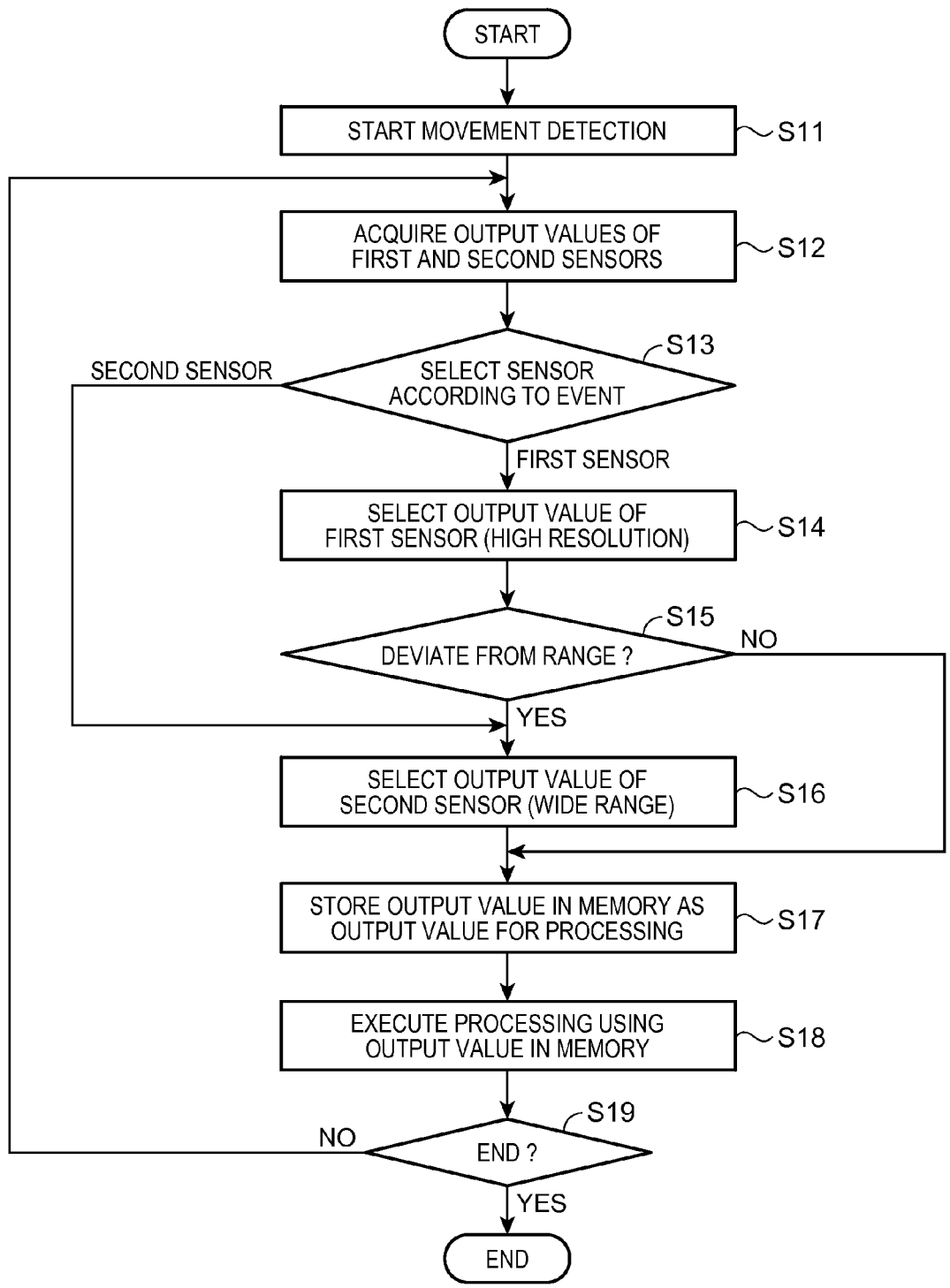
FIG. 5 is a flowchart for explaining an example of the operation of the head-mounted display device.

FIG. 5 is a flowchart for explaining an example of the operation of the head-mounted display device 100. In particular, processing based on output values of the first sensor 161 and the second sensor 162 is shown.

The control section 110 starts movement detection (step S11) and acquires output values of both of the first sensor 161 and the second sensor 162 via the sub-control section 150 (step S12). When sampling cycles of the first sensor 161 and the second sensor 162 are different, the sub-control section 150 only has to acquire and retain the output value of the first sensor 161 and the output value of the second sensor 162. In this case, when the control section 110 requests the sub-control section 150 to output the detection values of the first sensor 161 and the second sensor 162, the sub-control section 150 only has to output latest output values of the first sensor 161 and the second sensor 162.

The control section 110 selects one of the first sensor 161 and the second sensor 162 according to an event (step S13). In step S13, the control section 110 may perform not only the selection of the first sensor 161 and the second sensor 162 but also selection of the acceleration sensor and the angular velocity sensor.

Specific examples of the processing in step S13 include three methods of (1) selecting the first sensor 161 or the second sensor 162 according to operation by the user, (2) selecting the first sensor 161 or the second sensor 162 with the application 112 executed by the control section 110, and (3) selecting the first sensor 161 and the second sensor 162 according to a function executed by the control section 110.

In the method of (1), the control section 110 enables the selection of the first sensor 161 and the second sensor 162 using a GUI. For example, the control section 110 only has to perform display for sensor selection in the visual field VR and cause the user to select "high resolution" and "low resolution" or "narrow range" and "wide range". For example, when the user desires highly accurate and delicate operation in operating the pointer P shown in FIG. 4A, the first sensor 161 is selected. The control section 110 can detect, on the basis of the output value of the first sensor 161 or the second sensor 162, operation on the frame 2 such patting, touching, or swinging of the frame 2. Therefore, the control section 110 may switch the first sensor 161 and the second sensor 162 according to the operation on the frame 2. For example, the control section 110 can select the first sensor 161 according to the operation of patting the end portion ER of the right optical-image display section 26 of the frame 2 and select the second sensor 162 according to the operation of patting the end portion EL of the left optical-image display section 28. Unlike the GUI, this operation does not require display in the visual field VR. Therefore, even in a state in which the control section 110 does not display the menu screen M, the control section 110 can always execute the operation.

In the method of (2), when the control section 110 executes the application 112, a function of selecting and designating one of the first sensor 161 and the second sensor 162 is included in functions of the application 112. Specifically, the application 112 may designate resolution and a detection range or may designate a high-resolution sensor or a wide-range sensor among the plurality of sensors.

In the method of (3), when the control section 110 executes the function, the control section 110 selects the first sensor 161 or the second sensor 162 on the basis of whether an output value corresponding to the function is a high-resolution output value or a wide-range output value. The sensors may be set in advance for each of functions executed by the control section 110. For example, a high-resolution sensor may be associated with a function of displaying the GUI shown in FIG. 4A.

In this way, after acquiring the output values of the first sensor 161 and the second sensor 162, the control section 110 selects one of the sensors (step S13). When the first sensor 161 is selected in step S13, the control section 110 selects, as a processing target, the output value of the first sensor 161 acquired in step S12 (step S14).

The control section 110 determines whether the selected output value of the first sensor 161 is a value deviating from the detection range of the first sensor 161 (step S15). If the output value is a value deviating from the detection range of the first sensor 161 (YES in step S15), the control section 110 selects the output value of the second sensor 162 as the processing target (step S16). When the second sensor 162 is selected in step S13, the control section 110 also selects the output value of the second sensor 162 as the processing target (step S16).

If the output value is within the detection range of the first sensor 161 (NO in step S15) and if the output value of the second sensor 162 is selected as the processing target (step S16), the control section 110 stores the selected output value in the memory 121 (step S17). The control section 110 executes processing using the output value stored in the memory 121 (step S18).

When the control section 110 determines whether to end the movement detection processing by the first sensor 161 and the second sensor 162 (step S19). If not ending the movement detection processing (NO in step S19), the control section 110 returns to step S12. When the end is instructed by operation of the control device 10 or when the head-mounted display device 100 is turned off by the power switch 18, the control section 110 ends the processing shown in FIG. 5 (YES in step S19).

Figure 6:
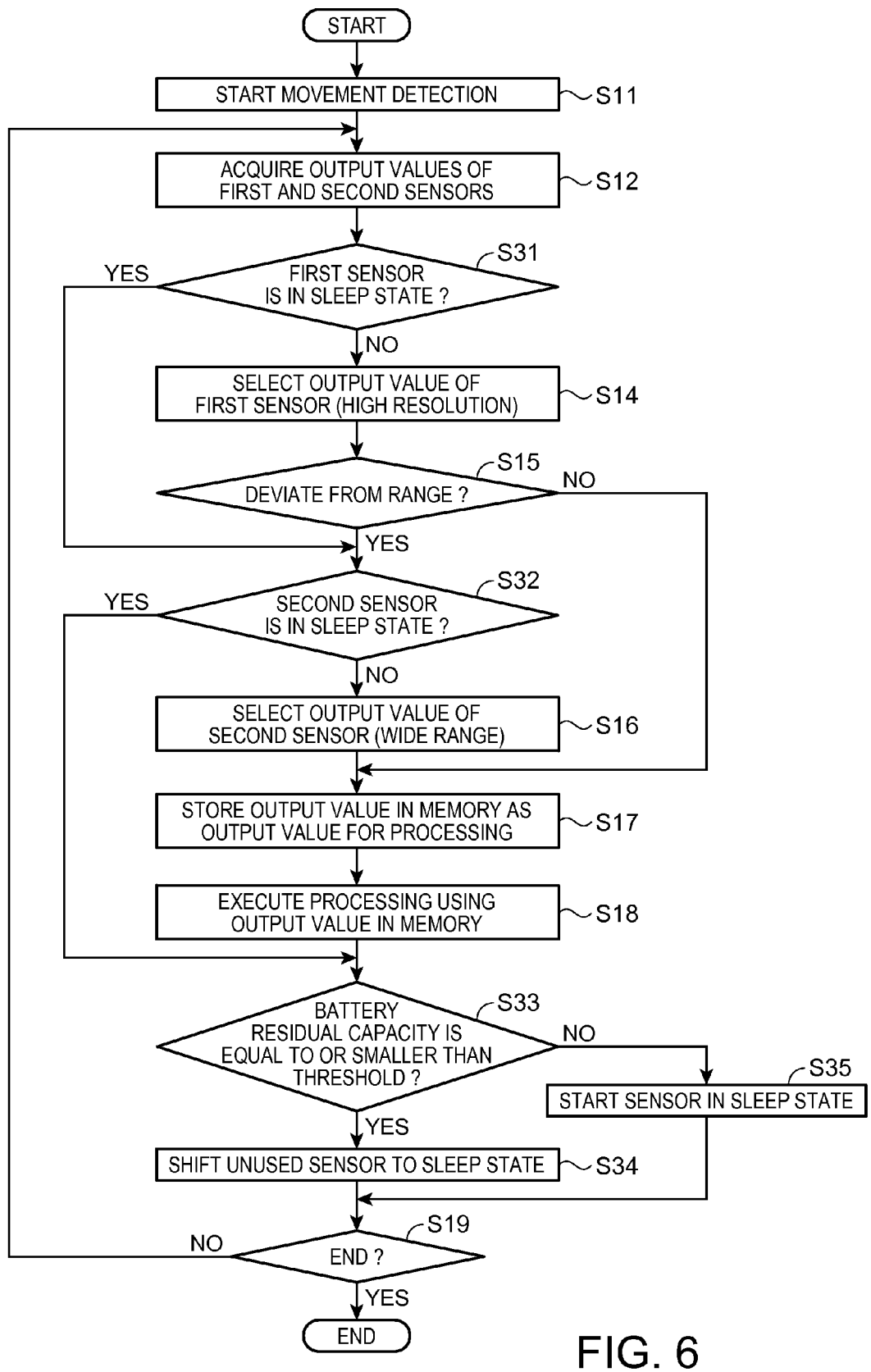
FIG. 6 is a flowchart for explaining another example of the operation of the head-mounted display device.

FIG. 6 is a flowchart for explaining another example of the operation of the head-mounted display device 100. In particular, another kind of processing based on the output values of the first sensor 161 and the second sensor 162 is shown. In FIG. 6, the operation of the control section 110 for controlling the first sensor 161 and the second sensor 162 according to the residual capacity of a battery connected to the power-supply control section 123 is shown. Note that steps common to FIG. 5 is denoted by the same step numbers and explanation of the steps is omitted.

The control section 110 starts movement detection (step S11), acquires output values of both of the first sensor 161 and the second sensor 162 (step S12), and determines whether the first sensor 161 is in the sleep state (step S31).

If the first sensor 161 is not in the sleep state, the control section 110 selects, as a processing target, the output value of the first sensor 161 acquired in step S12 (step S14). The control section 110 determines whether the output value of the first sensor 161 is a value deviating from the detection range of the first sensor 161 (step S15).

If the output value is a value deviating from the detection range of the first sensor 161 (YES in step S15), the control section 110 determines whether the second sensor 162 is in the sleep state (step S32). If it is determined in step S31 that the first sensor 161 is in the sleep state, the control section 110 also performs the determination in step S32.

If the second sensor 162 is not in the sleep state, the control section 110 selects, as the processing target, the output value of the second sensor 162 acquired in step S12 (step S16). Thereafter, the control section 110 stores the output value selected in step S16 in the memory 121 (step S17). If the output value of the first sensor 161 is within the detection range of the first sensor 161 (NO in step S15), the control section 110 stores the output value of the first sensor 161 in the memory 121 (step S17). The control section 110 executes the processing using the output value stored in the memory 121 (step S18).

On the other hand, if the second sensor 162 is in the sleep state (YES in step S32), the control section 110 acquires the residual capacity of the battery with the power-supply control section 123 and determines whether the residual capacity of the battery is equal to or smaller than the threshold set in advance (step S33). That is, the control section 110 determines whether the residual capacity of the power supply of the head-mounted display device 100 is equal to or smaller than the threshold. The control section 110 determines the residual capacity of the battery even after the processing is executed using the output value in step S18 (step S33).

If it is determined that the residual capacity of the battery is equal to or smaller than the threshold (YES in step S33), the control section 110 shifts the unselected sensor of the first sensor 161 and the second sensor 162 to the sleep state (step S34). The selected sensor indicates the sensor, the output value of which is stored in the memory 121 in step S17. The other is the "unselected sensor". Thereafter, the control section 110 shifts to step S19.

If it is determined the residual capacity of the battery exceeds the threshold (NO in step S33), the control section 110 shifts the sensor in the sleep state of the first sensor 161 and the second sensor 162 to the normal operation state (step S35). Thereafter, the control section 110 shifts to step S19.

In this way, the control section 110 suppresses power consumption by stopping the sensors when the residual capacity of the battery is small. In the operation shown in FIG. 6, when the first sensor 161 is sleeping and when acceleration or angular velocity exceeding the detection range of the first sensor 161 is detected, the control section 110 selects the second sensor 162. Therefore, when the first sensor 161 is preferentially selected and the output value of the first sensor 161 cannot be used, the second sensor 162 is used. Therefore, it is possible to process a high-resolution output value. When the high-resolution output value cannot be used, the output value of the second sensor 162 acquired at the same timing (step S12) is used. Therefore, it is unnecessary to acquire an output value anew. It is possible to prevent a delay and the like of the processing.

As explained above, the head-mounted display device 100 in the embodiment applied with the invention is the display device worn on the body of the user. The head-mounted display device 100 includes the first sensor 161 and the second sensor 162, which are the plurality of sensors. The control section 110 of the head-mounted display device 100 switches the detection value of one of the first sensor 161 and the second sensor 162 to perform processing and controls the head-mounted display device. The control section 110 switches the output values of the plurality of inertial sensors having different resolutions and uses the output values for the processing. Therefore, for example, it is possible to use an appropriate sensor according to requested accuracy and a requested detection range. Therefore, when detection concerning a movement of the body of the user is performed, it is possible to cover a wide range. It is possible to improve detection accuracy.

The first sensor 161 and the second sensor 162 have the different resolutions. The control section 110 selects one of the first sensor 161 and the second sensor 162 and executes processing on a detection value of the selected sensor. When the processing cannot be executed with the detection value of the selected sensor among the plurality of sensors, the processing is executed with a detection value of another sensor. Therefore, when the detection value with which the processing cannot be executed is obtained, it is possible to prevent a lack and a delay of the processing by using a detection value of another sensor.

The control section 110 is configured to execute the application 112 and execute the processing. The control section 110 selects the sensor associated with the application 112 to be executed of the first sensor 161 and the second sensor 162. By selecting the sensor corresponding to the computer program to be executed, it is possible to perform processing using a detection value optimum for accuracy and a detection range requested in executing the computer program.

The control section 110 is configured to be capable of executing a plurality of functions respectively associated with the selected sensor of the first sensor 161 and the second sensor 162. Since the sensor corresponding to a function to be executed can be selected, it is possible to perform the processing using a detection value optimum for requested accuracy and a requested detection range. In the multi-function head-mounted display device 100 capable of executing the plurality of functions, it is possible to select an appropriate sensor for each of the functions.

When the detection value of the selected sensor is a value deviating from the detection range of the selected sensor, the control section 110 selects another sensor. Specifically, the control section 110 selects the high-resolution first sensor 161. When the detection value is a value deviating from the detection range of the first sensor 161, the control section 110 selects the second sensor 162. Therefore, it is possible to use a highly accurate detection value within the detection range of the high-resolution sensor. Since the detection value of the second sensor 162 is used when the detection value deviates from the detection range, it is possible to prevent a lack and a delay of the processing.

The control section 110 acquires both of the detection value of the first sensor 161 and the detection value of the second sensor 162 and selects one of the acquired detection values to perform processing. Therefore, when the measurement range is exceeded in one of the sensors or when accuracy of a value cannot be expected because of a limit of resolution, it is possible to quickly perform the processing using the detection value of the other sensor. At this point, since a detection value is not acquired again, it is possible to prevent a delay of processing. It is possible to perform the processing using a detection value not including a shift of detection timing.

The head-mounted display device 100 includes the frame 2 and the first sensor 161 and the second sensor 162 provided in the frame 2. The second sensor 162 has the resolution different from the resolution of the first sensor 161. The head-mounted display device 100 includes the control section 110 that switches the detection values of the first sensor 161 and the second sensor 162 to perform processing. The head-mounted display device 100 switches the detection values of the plurality of inertial sensor having different resolutions and uses the detection values for the processing. Therefore, for example, under a condition in which a detection range required of the inertial sensors is narrow, a detection value of the high-resolution inertial sensor can be used for the processing. Therefore, when detection concerning a movement of the body of the user is performed, it is possible to cover a wide detection range. It is possible to improve detection accuracy.

The first sensor 161 and the second sensor 162 are mounted on the same sensor board 65 disposed in the frame 2. Therefore, the plurality of inertial sensor can perform detection concerning a movement under the same condition. An error involved in the switching of the inertial sensors less easily occurs.

Further, since the frame 2 is worn on the head of the user, by using the first sensor 161 and the second sensor 162, it is possible to perform detection in a wide range concerning a movement of the head. For example, when the user moves the head by himself or herself or when the user is walking, acceleration and angular velocity detected by the first sensor 161 and the second sensor 162 are relatively small. On the other hand, when the user is riding a mobile body such as a railroad car or an automobile, the first sensor 161 and the second sensor 162 detect acceleration and angular velocity of a movement of the mobile body. In this case, the detected acceleration and the detected angular velocity are sometimes large. In this way, detection of a movement to be detected by the control section 110 in a state in which the user wears the image display section 20 on the head is requested to be wide and, in some case, requested to have high resolution. The head-mounted display device 100 in this embodiment appropriately switches the detection values and performs the processing using the first sensor 161 and the second sensor 162. Therefore, the head-mounted display device 100 can cope with the problems peculiar to the device worn on the body and appropriately perform detection concerning a movement of the head of the user.

The frame 2 has the shape extending in the left-right direction of the user in a state in which the frame is worn on the head of the user. The first sensor 161 and the second sensor 162 are disposed in the center in the left-right direction of the frame 2. Therefore, concerning a movement of the head of the user, it is possible to perform detection near a position where the user feels the movement of the head.

The first sensor 161 and the second sensor 162 are provided in the frame 2 worn on the head of the user. Therefore, it is possible to detect a movement, i.e., a movement in the visual line direction of the head of the user. Therefore, by performing the processing using the detection values and a picked-up image of the camera 61 together, it is possible to perform surface treatment of AR contents. It is possible to switch and display, on the basis of the detection values of the first sensor 161 and the second sensor 162, a position and a size of a display region where an image is displayed in the image display section 20. Further, it is also possible to determine a type of a movement of the user from the detection values of the first sensor 161 and the second sensor 162 and select, according to the type of the movement, a display form of an image by the image display section 20 and an image to be displayed. For example, it is possible to determine whether the type of the movement of the user is walking, a running motion, or riding on a vehicle and switch, according to whether the user is riding on the vehicle or not riding the vehicle, an image or a video to be displayed.

Each of the first sensor 161 and the second sensor 162 is configured by the sensor that detects at least one of acceleration and angular velocity on one or a plurality of axes. An axis of detection of the first sensor 161 and an axis of detection of the second sensor 162 are associated. Therefore, when the first sensor 161 is switched to the second sensor 162 or when the second sensor 162 is switched to the first switch 161, it is possible to easily switch the processing performed using the detection values. It is possible to efficiently perform the processing. For example, it is conceivable to set the axis of detection of the first sensor 161 and the axis of detection of the second sensor 162 in parallel to each other. In this case, even when the detection values of the first sensor 161 and the second sensor 162 are switched, since the axes of the detection values are the same, the switching is easy. If a mutual angle and the like of the axis of detection of the first sensor 161 and the axis of detection of the second sensor 162 are known, the detection values can be converted. For example, the detection value of the second sensor 162 can be converted into a detection value on the detection axis of the first sensor 161. The detection value of the first sensor 161 can be converted into a detection value on the detection axis of the second sensor 162.

In the embodiment, the configuration is illustrated in which the sensor board 65 mounted with the first sensor 161 and the second sensor 162 is provided in the frame 2. However, the position of the sensor board 65 is not limited to the frame 2. That is, the sensor board 65 may be housed and disposed in a device separate from the frame 2. For example, the sensor board 65 may be disposed in an electronic apparatus of a wristwatch type worn on the arm of the user, an electronic apparatus worn on the leg or the waist, or the control device 10. In this case, the electronic apparatus including the sensor board 65 only has to transmit data of detection values to the sub-control section 150 housed in the frame 2 or the control section 110 mounted on the control device 10. For example, wired connection by a USB cable or wireless connection by Bluetooth (registered trademark) or WiFi (registered trademark) can be used.

The sensors are not limited to the first sensor 161 and the second sensor 162. The camera 61 may be used as one of the sensors. That is, by acquiring, in time series order, picked-up images of the camera 61 picked up at different timings and comparing and analyzing the picked-up images, it is possible to calculate a turning direction and angular velocity of the camera 61 on the basis of the picked-up images. By converting the angular velocity into a format of a detection value of angular velocity of a gyro sensor, the camera 61 can be used as an inertial sensor. Therefore, a combination of the first sensor 161 and the camera 61, a combination of the second sensor 162 and the camera 61, and a combination of the first sensor 161 and the second sensor 162 can be used as a plurality of sensors.

All of the detection values of the first sensor 161 and the second sensor 162 may be captured into the memory 121 not through the processing of acquisition by the control section 110. In this case, the control section 110 only has to acquire the detection values from the memory 121 in step S12. That is, the control section 110 may directly acquire the detection values from the first sensor 161 and the second sensor 162 or may once acquire the detection values via the second sensor 162.

The image display section 20 is configured to display an image while enabling the user to visually recognize an outside scene. The control section 110 associates the outside scene visually recognized through the image display section 20 and a display image or a display region where an image is displayed. That is, the control section 110 associates the half mirrors 261A and 262A configuring the display region or images displayed on the half mirrors 261A and 262A and the outside scene according to the processing performed using the detection value of the first sensor 161 or the second sensor 162. Consequently, it is possible to associate, on the basis of the detection values of the first sensor 161 and the second sensor 162, the outside scene visually recognized by the user and the region where the image is displayed. Therefore, for example, when AR display for adjusting an image (including characters, signs, and figures) of AR contents to an object seen (present) as the outside scene and causing the user to visually recognize the image, a display position of the AR contents can be appropriately adjusted to the object seen as the outside scene. By using the detection values of the first sensor 161 and the second sensor 162, it is possible to highly accurately perform positioning of the display position. It is possible to cope with a movement of the body of the user in a wide range.

In this embodiment, the configuration in which the sensor board 65 is fixedly provided in the frame 2 is explained as an example. However, the sensor board 65 may be configured to be displaceable. This example is explained as a modification.

Modification

Figure 7:
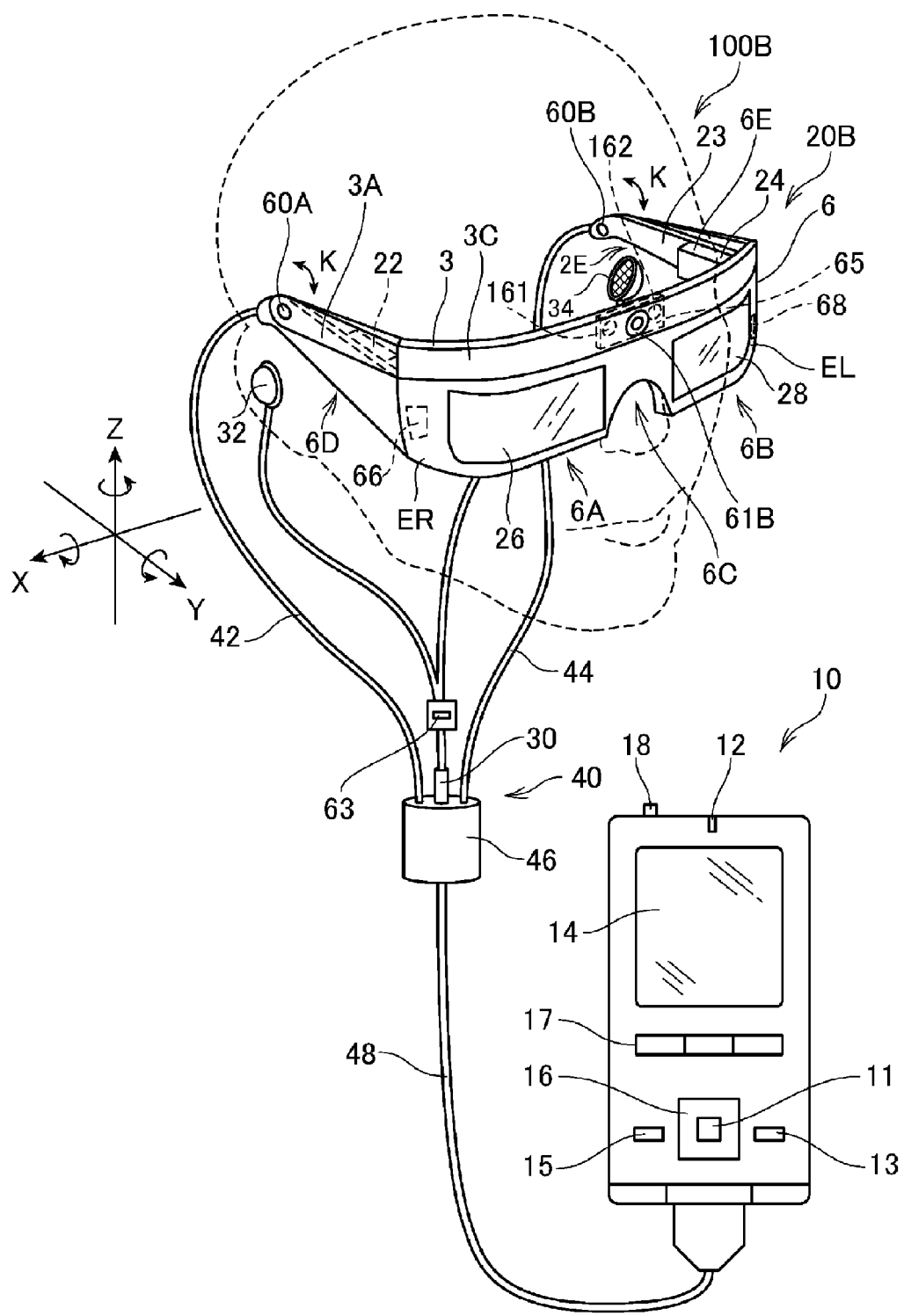
FIG. 7 is a diagram showing the exterior configuration of a head-mounted display device in a modification.

FIG. 7 is a diagram showing the exterior configuration of a head-mounted display device 100B according to a modification of this embodiment.

The head-mounted display device 100B in the modification has a configuration in which an image display section 20B is connected to the control device 10 in the embodiment. Note that, in the image display section 20B, sections configured the same as the sections of the image display section 20 are denoted by the same reference numerals and signs and explanation of the sections is omitted.

Like the image display section 20 (FIG. 1), the image display section 20B is connected to the control device 10 via the connecting section 40. The image display section 20B and the control device 10 transmit various signals via the connecting section 40.

The image display section 20B is a wearing body worn on the head of the user. In this embodiment, the image display section 20B includes a frame 6 (a main body) of an eyeglass shape. The frame 6 includes a right section 6A located in front of the right eye of the user and a left section 6B located in front of the left eye. The right section 6A and the left section 6B are coupled by a bridge section 6C (a coupling section). The bridge section 6C couples the right section 6A and the left section 6B each other in a position corresponding to the middle of the forehead of the user when the user wears the image display section 20B.

The right section 6A and the left section 6B are respectively coupled to temple sections 6D and 6E. The temple sections 6D and 6E support the frame 6 on the head of the user like temples of eyeglasses. The right optical-image display section 26 is disposed in the right section 6A. The left optical-image display section 28 is disposed in the left section 6B. The right optical-image display section 26 and the left optical-image display section 28 are respectively located in front of the right and left eyes of the user when the user wears the image display section 20B.

The temple section 6D is provided to extend from the end portion ER, which is the other end of the right optical-image display section 26, to a position corresponding to the temporal region of the user when the user wears the image display section 20B. Similarly, the temple section 6E is provided to extend from the end portion EL, which is the other end of the left optical-image display section 28, to a position corresponding to the temporal region of the user when the user wears the image display section 20B. The temple section 6D is in contact with the right ear or the vicinity of the right ear in the head of the user and the temple section 6E is in contact with the left ear of the user or the vicinity of the left ear. The temple section 6D and the temple section 6E hold the image display section 20B on the head of the user.

A camera unit 3 is provided in the frame 6. The camera unit 3 includes a camera pedestal section 3C and arm sections 3A and 3B that support the camera pedestal section 3C. The arm section 3A is rotatably coupled to the temple section 6D by a hinge 60A provided at a distal end portion AP of the temple section 6D. The arm section 3B is rotatably coupled to the temple section 6E by a hinge 60B provided at a distal end portion AP of the temple section 6E. Therefore, the camera unit 3 as a whole is capable of turning in a direction indicated by an arrow K in the figure, that is, up and down in a worn state. The camera unit 3 is in contact with the frame 6 at a lower end of a turning range. An upper end of the turning range of the camera unit 3 is determined by, for example, specifications of the hinges 60A and 60B.

The camera pedestal section 3C is a plate-like or bar-like member located to extend above the right section 6A, the left section 6B, and the bridge section 6C. The sensor board 65 is embedded and set in a position equivalent to a part above the bridge section 6C. As explained above, the first sensor 161 and the second sensor 162 are mounted on the sensor board 65. The camera 61 mounted on the sensor board 65 is exposed in the camera pedestal section 3C.

Note that the camera 61 may be mounted on a board separate from the sensor board 65.

In the configuration in which the camera unit 3 is provided to be displaceable with respect to the frame 6 in this way, the invention can also be applied in a configuration in which the first sensor 161 and the second sensor 162 are mounted on the camera unit 3.

In the configuration shown in FIG. 7, the camera unit 3 is movable with respect to the frame 6. Therefore, it is likely that relative positions of the first and second sensors 161 and 162 and the head of the user change.

Therefore, for example, while the movement detection is performed, for example, the hinges 60A and 60B only have to be able to be fixed or held such that the camera unit 3 is not displaced with respect to the frame 6. Alternatively, the control section 110 may detect a direction and a change amount of a position change of the camera unit 3 with respect to the frame 6. In this case, a sensor that detects turning amounts in the hinges 60A and 60B can be used. The control section 110 only has to correct the detection values of the first sensor 161 and the second sensor 162 on the basis of the detected direction of the displacement and the detected change amount.

Separately from the configuration shown in FIG. 7, the sensor board 65 may be fixed to the main body fixedly worn on the head of the user. The display section including the right optical-image display section 26 and the left optical-image display section 28 may be movable with respect to the main body. In this case, the relative positions of the first and second sensors 161 and 162 and the head of the user do not change. Therefore, as in the embodiment, the invention can be applied.

Note that the invention is not limited to the configurations of the embodiment and the modification and can be carried out in various forms without departing from the spirit of the invention.

For example, instead of the image display sections 20 and 20B, an image display section of another system such as an image display section worn like a cap may be adopted. The image display section only has to include a display section that displays an image to correspond to the left eye of the user and a display section that displays an image to correspond to the right eye of the user. The display device according to the invention may be configured as, for example, a head mounted display mounted on a vehicle such as an automobile or an airplane. The display device according to the invention may be configured as, for example, a head mounted display incorporated in a body protector such as a helmet. In this case, a portion for positioning a position corresponding to the body of the user and a portion positioned with respect to the portion can be a mounting section.

As the control device 10, a notebook computer, a tablet computer, or a desktop computer may be used. Alternatively, as the control device 10, portable electronic apparatuses including a game machine, a cellular phone, a smart phone, and a portable media player, other dedicated apparatuses, or the like may be used.

For example, the configuration for generating image light in the image display sections 20 and 20B may include an organic EL (Electro-Luminescence) display and an organic EL control section. As the configuration for generating image light, an LCOS (Liquid Crystal on Silicon: LCoS is a registered trademark), a digital micro mirror device, or the like can also be used.

As the optical system for guiding image light to the eyes of the user, it is possible to adopt an optical system including an optical member that transmits external light made incident toward the device from the outside and configured to make the light incident on the eyes of the user together with the image light. An optical member located in front of the eyes of the user and overlapping a part or the entire visual field of the user may be used. Further, a scanning-type optical system for scanning a laser beam or the like to form image light may be adopted. The optical system is not limited to an optical system for guiding the image light on the inside of an optical member and may be an optical system having only a function of refracting and/or reflecting the image light and guiding the image light toward the eyes of the user.

For example, it is also possible to apply the invention to a head mounted display of a laser retinal projection type. That is, an optical system may be adopted in which a light emitting section includes a laser beam source and an optical system for guiding a laser beam to the eyes of the user, makes the laser beam incident on the eyes of the user to scan the retina, and forms an image on the retina to thereby cause the user to visually recognize the image.

The invention can also be applied to a display device that adopts a scanning optical system including a MEMS mirror and makes use of a MEMS display technique. That is, the display device may include, as a light emitting section, a signal-light forming section, a scanning optical system including a MEMS mirror that scans light emitted by the signal-light forming section, and an optical member on which a virtual image is formed by the light scanned by the scanning optical system. In this configuration, the light emitted by the signal-light forming section is reflected by the MEMS mirror, made incident on the optical member, and guided in the optical member to reach a virtual-image forming surface. The MEMS mirror scans the light, whereby a virtual image is formed on a virtual image forming surface. The user catches the virtual image with the eyes to recognize an image. An optical component in this case may be an optical component that guides light through a plurality of times of reflection like, for example, the right light guide plate 261 and the left light guide plate 262 in the embodiments. A half mirror surface may be used as the optical component.

At least a part of the functional blocks shown in FIG. 3 may be realized by hardware or may be realized by cooperation of the hardware and software. Therefore, the functional blocks are not limited to the configuration in which the independent hardware resources are disposed as shown in FIG. 3. The functional sections shown in FIG. 3 are not limited to an example of a configuration including a microprocessor and an IC and may be a configuration in which a plurality of functional sections are mounted on a larger integrated circuit or may be a form of an SoC (System-on-a-chip). The components formed in the control device 10 may be redundantly formed in the image display section 20.

The entire disclosure of Japanese Patent Application No. 2014-260215, filed Dec. 24, 2014 is expressly incorporated by reference herein.

What is claimed is:

1. An electronic apparatus worn on a body of a user, the electronic apparatus comprising:
a plurality of sensors having different resolutions and detection ranges; and
a control section configured to switch a detection value of any one of the plurality of sensors to perform processing and control the electronic apparatus, wherein
the control section selects any one of the plurality of sensors, executes the processing with a detection value of the selected sensors, selects a high-resolution sensor among the plurality of sensors, and when the processing cannot be executed with a detection value of the selected sensor, executes the processing with a detection value of another one of the sensors.

2. The electronic apparatus according to claim 1, wherein the control section is configured to execute a computer program and execute the processing and selects the sensor associated with the computer program to be executed among the plurality of sensors.

3. The electronic apparatus according to claim 1, wherein the control section is configured to be capable of executing a plurality of functions respectively associated with selected sensors among the plurality of sensors.

4. The electronic apparatus according to claim 1, wherein, when a detection value of the selected sensor is a value deviating from a detection range of the selected sensor, the control section selects another one of the sensors.

5. The electronic apparatus according to claim 4, wherein the control section selects the high-resolution sensor among the plurality of sensors, and when a detection value of the selected sensor is a value deviating from a detection range of the selected sensor, selects another one of the sensors.

6. The electronic apparatus according to claim 1, wherein the control section acquires detection values of the plurality of sensors and selects any one of the acquired detection values to perform the processing.

7. The electronic apparatus according to claim 1, wherein the plurality of sensors include at least an inertial sensor and an image pickup section.

8. The electronic apparatus according to claim 1, wherein the electronic apparatus includes a main body, and
the plurality of sensors include a first inertial sensor provided in the main body and a second inertial sensor provided in the main body together with the first inertial sensor and having resolution different from resolution of the first inertial sensor.

9. The electronic apparatus according to claim 8, wherein the first and second inertial sensors are mounted on a same substrate disposed in the main body.

10. The electronic apparatus according to claim 8, wherein the main body is worn on a head of the user.

11. The electronic apparatus according to claim 10, wherein
the main body has a shape stretchable in a left-right direction of the user in a state in which the main body is worn on the head of the user, and
the first and second inertial sensors are disposed in a center in the left-right direction of the main body.

12. An electronic apparatus worn on a body of a user, the electronic apparatus comprising:
a plurality of sensors having different resolutions; and
a control section configured to switch a detection value of any one of the plurality of sensors to perform processing and control the electronic apparatus, wherein
the electronic apparatus includes a main body,
the plurality of sensors include a first inertial sensor provided in the main body and a second inertial sensor provided in the main body together with the first inertial sensor and having resolution different from resolution of the first inertial sensor,
each of the first and second inertial sensors is configured by a sensor that detects at least one of acceleration and angular velocity on one or a plurality of axes, and
an axis of detection of the first inertial sensor and an axis of detection of the second inertial sensor are associated.

13. A display device comprising:
a display section worn on a head of a user and configured to display an image;
a plurality of sensors having different resolutions and detection ranges; and
a control section configured to switch a detection value of any one of the plurality of sensors to perform processing and control display in the display section according to the processing, wherein
the control section selects any one of the plurality of sensors, executes the processing with a detection value of the selected sensors, selects a high-resolution sensor among the plurality of sensors, and when the processing cannot be executed with a detection value of the selected sensor, executes the processing with a detection value of another one of the sensors.

14. The display device according to claim 13, wherein
the display section has a configuration for displaying the image while enabling the user to visually recognize an outside scene, and
the control section associates the outside scene and a display region by the display section according to the processing performed using the detection values of the sensors.

15. A control method for an electronic apparatus comprising:
switching, for an electronic apparatus worn on the body of a user and including a plurality of sensors having different resolutions and detection ranges, a detection value of any one of the plurality of sensor to perform processing and controlling the electronic apparatus; and
selecting any one of the plurality of sensors;
executing the processing with a detection value of the selected sensors;
selecting a high-resolution sensor among the plurality of sensors; and
when the processing cannot be executed with a detection value of the selected sensor, executing the processing with a detection value of another one of the sensors.

* * * * *